United States Patent Office 2,978,498
Patented Apr. 4, 1961

2,978,498

NITRO-SUBSTITUTED NITRAZA COMPOUNDS

Milton B. Frankel, Pasadena, and Karl Klager, Monrovia, Calif., assignors to Aerojet-General Corporation, Azusa, Calif., a corporation of Ohio No Drawing. Filed Jan. 22, 1957, Ser. No. 635,548

8 Claims. (Cl. 260—482)

This invention relates to new compositions of matter and a method for their preparation. In particular, this invention relates to nitro-substituted compounds having the general formula:

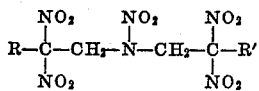

wherein R and R' are carboalkoxy-alkylene radicals.

This application is a continuation-in-part of our co-pending application No. 416,382, filed March 15, 1954, now abandoned.

These compounds are excellent plasticizers for nitropolymers, such as nitrocellulose, or the polyurethane plastics disclosed in assignee's copending application Serial No. 422,649, filed April 12, 1954, now abandoned. Commercial plasticizers used at the present time are non-explosive and hence detract from the explosive power of the nitropolymers into which they are incorporated. The compounds of this invention, however, are not only plasticizers but also exhibit high explosive energy.

The nitropolymers can be polymerized in the presence of the nitraza ester or the nitraza ester can be blended into the nitropolymer after polymerization. The plasticizer is incorporated into the nitropolymer in amounts of preferably from about 10% to about 40% by weight of the total mixture.

The new compositions of this invention are conveniently prepared by reacting nitro-substituted amine compositions with nitric acid, in accordance with the general reaction scheme set forth below:

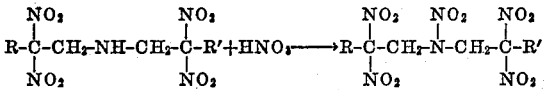

wherein R and R' are as defined above.

The nitro-substituted amine compounds used as starting materials in the practice of this invention are prepared by condensing carboalkoxy geminal polynitro-substituted alcohols with ammonia, as disclosed in our copending application No. 617,669, filed October 22, 1956, now Patent No. 2,880,232.

The following examples are presented to more clearly illustrate our invention. It should be understood, however, that these examples are presented purely for purposes of illustration and are not intended and do not limit or define the scope of the invention in any way.

EXAMPLE I

*Preparation of dimethyl 4,4,6,8,8-pentanitro-6-aza-1,11-undecanedioate*

To a nitrating mixture of 150 ml. of 100% nitric acid and 150 ml. of acetic anhydride, cooled to 5–10° C., was added 25.4 gm. (0.0598 mole) of dimethyl 4,4,8,8-tetranitro-6-aza-undecanedioate. The solution was stirred for 35 minutes at 5–10° C. and poured onto ice. The yield of dimethyl 4,4,6,8,8-pentanitro-6-aza-undecanedioate was 17.6 gm. (62.7%), M.P. 87–89° C. The product exhibited an impact stability of 100 cm./2 kg. Several recrystallizations from carbon tetrachloride raised the melting point to 91–92° C. The elemental analysis of the product is as follows:

Calculated for $C_{12}H_{18}N_6O_{14}$: percent C, 30.64; percent H, 3.86; percent N, 17.87. Found: percent C, 30.92; percent H, 3.86; percent N, 17.94.

The reaction is preferably conducted at a temperature in the range of from about 0° to 15° C., however, both higher and lower temperatures can be used. At higher temperatures, the reaction is more difficult to control, while at lower temperatures, the reaction rate is lessened.

It will be appreciated that a variety of homologous compounds can be prepared according to our invention. For example, diethyl 4,4,6,8,8-pentanitro-6-aza-1,11-undecanedioate is prepared by reacting diethyl 4,4,8,8-tetranitro-6-aza-1,11-undecanedioate with nitric acid, and dimethyl 3,3,5,7,7-pentanitro-5-aza-1,9-nonanedioate is prepared by reacting dimethyl 3,3,7,7-tetranitro-5-aza-1,9-nonanedioate with nitric acid. Both higher and lower members of this series can also be prepared according to our invention simply by reacting appropriate starting materials with nitric acid.

We claim:

1. As compositions of matter, the nitro-substituted nitraza compounds having the general formula:

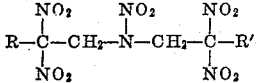

wherein R and R' are lower carboalkoxy-alkylene radicals.

2. As a composition of matter, dimethyl 4,4,6,8,8-pentanitro-6-aza-1,11-undecanedioate having the structural formula:

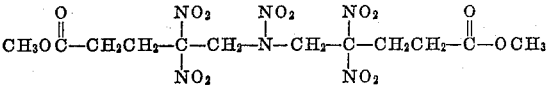

3. As a composition of matter, diethyl 4,4,6,8,8-pentanitro-6-aza-1,11-undecanedioate having the structural formula:

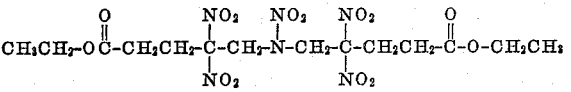

4. As a composition of matter, dimethyl 3,3,5,7,7-pentanitro-5-aza-1,9-nonanedioate having the structural formula:

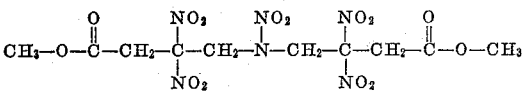

5. The method of preparing nitro-substituted nitraza compounds having the general formula:

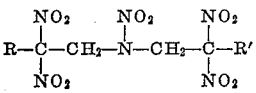

which comprises reacting nitric acid with a nitro-substituted amine having the general formula:

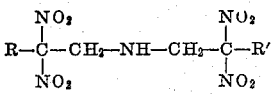

wherein R and R' are lower carboalkoxy-alkylene radicals.

6. The method of preparing dimethyl 4,4,6,8,8-pentanitro-6-aza-1,11-undecanedioate which comprises reacting dimethyl 4,4,8,8-tetranitro-6-aza-1,11-undecanedioate with nitric acid.

7. The method of preparing diethyl 4,4,6,8,8-pentanitro-6-aza-1,11-undecanedioate which comprises reacting diethyl 4,4,8,8-tetranitro-6-aza-1,11-undecanedioate with nitric acid.

8. The method of preparing dimethyl 3,3,5,7,7-pentanitro-5-aza-1,9-nonanedioate which comprises reacting dimethyl 3,3,7,7-tetranitro-5-aza-1,9-nonanedioate with nitric acid.

No references cited.